3,085,850
PROCESS AND COMPOSITION FOR RETARDING WATER EVAPORATION

Richard R. Egan, Baltimore, Md., assignor to Alcolac Chemical Corporation, a corporation of Maryland
No Drawing. Filed June 3, 1957, Ser. No. 662,988
11 Claims. (Cl. 21—60.5)

This invention relates to a process and compositions effective to reduce surface evaporation of water and more particularly relates to a process and compositions effective in the reduction of surface evaporation of water in open tanks, ponds, lakes and reservoirs.

One of the more serious problems faced by agriculture, industry and those concerned with water supplies for urban areas, is the evaporation of water to the atmosphere during the summer months, particularly during periods of drought. Feeders of livestock and those employing water for irrigation, industrial purposes or for drinking are annually faced with water shortages during the summer months.

It has previously been suggested that certain chemical compounds be added to bodies of water to prevent surface evaporation. It is apparent that any such chemical to be successfully employed must be harmless to both animals and plants and must be such that the surface evaporation may be effectively reduced at reasonable cost. Perhaps the most desirable materials suggested by prior art investigators have been the long chain, solid, aliphatic alcohols which, if suitably dispersed on the surface of a body of water, will form a monomolecular layer effective to materially retard surface evaporation. Such materials as myristyl, cetyl and stearyl alcohols, for example, have been found in laboratory experiments to effect a marked reduction in surface evaporation.

Despite knowledge that these long-chain, solid, alcohols are efficacious in retardation of surface evaporation, the art has been unable to obtain a dispersion of the alcohol on the surface of bodies of water of any significant size necessary to form the desired monomolecular layer. The long-chain, solid aliphatic alcohols themselves are essentially non-self-dispersing. Any dispersant employed must be reasonably rapid in its action, must be such that it can be removed from the alcohol by the water and should be characterized by low toxicity and preferably no toxicity.

A primary object of the invention, therefore, is a process for effectively retarding surface evaporation of water by forming a vapor resistant chemical barrier on the said surface.

A further object of the invention is a process for dispersing a monomolecular layer of a long-chain, solid, aliphatic alcohol on the surface of a body of water to effect a reduction in surface evaporation.

Another object of the present invention is a self-dispersing composition which, when added to water, will effectively reduce surface evaporation.

An additional object of the invention is a self-dispersing composition containing at least one long-chain, solid, aliphatic alcohol which, when added to a body of water, will form a monomolecular layer of the alcohol on the surface thereof effective to markedly reduce surface evaporation.

As one embodiment thereof, the present invention comprises: a process for retarding surface evaporation from bodies of water which comprises adding to said body of water a solid composition comprising at least one solid, aliphatic alcohol having at least 14 carbon atoms and from about 5 to about 25% by weight of said solid alcohol of a liquid, aliphatic alcohol having from 6 to 10 carbon atoms.

A further embodiment of the invention is a normally solid, self dispersing composition useful as an additive to water for retardation of surface evaporation which comprises at least one solid, aliphatic alcohol having at least 14 carbon atoms and from about 5 to about 25% by weight of said solid alcohol of a liquid, aliphatic alcohol having from 6 to 10 carbon atoms.

The long-chain, solid aliphatic alcohols operable in accordance with the invention to form a monomolecular layer on aqueous surfaces contain at least 14 carbon atoms and include myristyl, cetyl and stearyl alcohols and mixtures thereof. Cetyl and stearyl alcohols are preferred.

The liquid, aliphatic alcohols operable in the invention as dispersing agents contain from 6 to 10 carbon atoms and include straight-chain alcohols including, without limitation, hexanol, heptanol, 1-octanol, n-nonyl alcohol, and n-decanol; and branched chain alcohols including, without limitation, 2-hexanol, 2-octanol, 2-ethyl hexanol, 4-heptanol, 3-ethyl pentanol, 2-ethyl butanol.

Normally solid, self-dispersing compositions effective to retard surface evaporation in accordance with the invention are desirably prepared by admixing the long-chain, solid alcohol having from 14 to 18 carbon atoms with from about 5 to about 25% by weight of the liquid aliphatic alcohol having from 6 to 10 carbon atoms in a suitable vessel and heating at a temperature above the melting point of the solid alcohol until a solution is obtained. Since it is critical that the normally solid composition be essentially homogeneous when used in the process of the invention, care must be taken in the cooling of the molten composition to prevent separation due to their higher melting points (although myristyl alcohol gives excellent results at atmosphere temperatures of below about 100° F.) of the alcohols during crystallization of the normally solid alcohol. If separation occurs, the self-dispersing characteristics of the solid composition are deleteriously affected. It is preferred, therefore, that the molten admixture of the two alcohols either should be very slowly cooled or else very rapidly quenched to insure a more highly homogeneous product.

It is critical to the invention that the normally liquid alcohol dispersant be incorporated in the composition in an amount from between about 5% and about 25%. If less than about 5% of the normally liquid alcohol is employed, insufficient spreading is obtained and the desired monomolecular layer of solid alcohol is not obtained with practical rapidity. If, on the other hand, more than 25% of 6 to 10 carbon atom alcohol is employed, the composition becomes soft and difficult to handle and control and the monomolecular layer washes away too readily under the action of wind and waves. Moreover, incorporation of more than the optimum amount of dispersant lowers the amount of normally solid alcohol present in a given quantity of composition, unnecessarily contaminates the water and is expensive.

It has been found that the optimum concentration of dispersant is about 10%. This concentration gives adequate spreading power and produces a very stable monomolecular film. In fact, it has been noted that at a 10% concentration, the evaporation rate decreases with age of the film while at concentrations approaching 5%, the evaporation rate increases with the age of the film. A decreasing evaporation rate is noted as the concentration approaches the 20% level. Moreover, as the 20% level is exceeded and the upper limit of 25% is approached, an increasing evaporation rate is again encountered due to the film instability engendered by the effect of wind, temperature and waves as the higher concentrations are reached.

Reductions in surface evaporation of between about 20 and 45% are achieved in accordance with the invention under normal outdoor conditions. Considerably higher reductions may be achieved in controlled laboratory tests, but such results cannot be duplicated under conditions of actual outdoor use.

Under ordinary conditions, the composition of the invention will form a monomolecular layer on the surface of a body of water at the rate of one square foot in from about 5 to about 10 seconds depending on the dispersant concentration. Preferably, the composition, which floats in water, will be employed in the form of a block or cylinder suitably anchored to float in the center of the surface area to be covered with the monomolecular layer. One five-pound block of the composition is desirably employed for each three acres of water surface and will maintain a monomolecular layer on a surface of such size for about three months if abnormally strong wind conditions are not encountered. It has been determined that from about .2 to about .4 pound of the composition of the invention per acre is required to produce an initial surface film. The excess employed replenishes the film as it is broken or blown away.

The compositions of the invention may also be added to the body of water in pellets, beads, and other finely divided forms and may be introduced by hand or from a boat or plane or from a screened raft as may be desired.

It has further been found that the presence in the film or composition of functional groups such as carboxyl, ester, aldehyde or keto groups adversely effects both the dispersibility of the solid alcohol and the barrier effect of the film and should be avoided. It is often desirable, however, to incorporate a germicide in the composition to prevent attack on the film by bacteria. Suitable germicides include phenol, resorcinol, o-phenylphenol, o-chlorophenylphenol, o-benzyl-4-chlorophenol, cresylic acid, and the like. Preferably, the germicide will be included in a concentration of between about .1 and about 1.% by weight of the composition.

Having generally described the invention, the following examples are presented for purposes of more specific illustration of particular, specific embodiments of the invention.

*Example I*

Commercial tallow alcohol of the following composition:

| | |
|---|---|
| 5.5% | C 12–14 alcohol. |
| 32.5% | C 16 alcohol. |
| 60.0% | C 18 alcohol. |
| 2.0% | Miscellaneous. | was admixed with 5% and 10% each of 2-ethyl hexanol and n-octanol. In each case the admixture was heated until a homogeneous molten solution was obtained. The solutions were slowly cooled to prevent crystallization of the tallow alcohol. Waxy, solid masses were obtained in each case. A few grams of each composition and of the tallow alcohol per se was added to the centers of a talcum powder-covered water surfaces 27 cm. in diameter and the time required for the powder to move to the edges of the surface was noted. The following results were obtained.

| Test | Dispersant | Percent Dispersant | Spreading Rate (Seconds) |
|---|---|---|---|
| 1 | 2-ethyl hexanol | 5 | 6. |
| 2 | ____do____ | 10 | 6. |
| 3 | n-octanol | 5 | 6. |
| 4 | ____do____ | 10 | 5. |
| 5 | Tallow alcohol without dispersant | | no movement of powder. |

In each of tests 1 through 4 an evaporation retarding monomolecular layer of tallow alcohol was formed on the water surface.

*Example II*

Compositions were prepared as in Example I containing the tallow alcohol and 10% of n-octanol alcohol and 10% of 4-heptanol, respectively. After the compositions had been added to test water surfaces and monomolecular layers were formed, the following evaporation retardation values were measured:

| Time | Evaporation Reduction | |
|---|---|---|
| | n-Octanol, percent | 4-heptanol, percent |
| First 3 hours | 22.4 | 29.7 |
| From 7th to 22nd hour | 25.0 | 25.7 |
| From 29th to 94th hour | 37.8 | 39.0 |

*Example III*

The tests of Example 2 were repeated except for substituting 5% of 2-ethyl hexanol and n-octanol, respectively, as the spreading agents employed. The following results were obtained.

| Time | Evaporation Reduction | |
|---|---|---|
| | n-Octanol, percent | 4-heptanol, percent |
| First 3 hours | 38.2 | 23.7 |
| From 3rd to 19th hour | 45.4 | 36.4 |
| From 27th to 44th hour | 39.1 | 29.0 |
| From 44th to 67th hour | 29.5 | 21.3 |

*Example IV*

Self-dispersible compositions were prepared employing the commercial tallow alcohol of Example I in the manner disclosed in Example I but which contained 10% of 2-ethyl hexanol and 10% of a commercial mixture of branched chain alcohols averaging six carbon atoms. When applied to a test surface it was determined that the composition containing 2-ethyl hexanol effected a reduction in surface evaporation of 23.6%, while the composition containing the blend of commercial branched chain alcohols effected a surface evaporation retardation of 26.4%.

*Example V*

Compositions in accordance with the invention were prepared employing the following commercial alcohol mixture:

| | |
|---|---|
| 4.6% | C 12–14. |
| 44.3% | C 16. |
| 49.5% | C 18. |
| 1.6% | Miscellaneous. |

To separate portions of this alcohol were added, respectiveldy, 10% and 20% of a commercial branched chain alcohol mixture averaging six carbon atoms. When applied to the test surface it was found that the compositions containing 10% of dispersant covered an area 20 centimeters in diameter in 15 seconds and effected a reduction in surface evaporation of 32.3%. The composition containing 20% of dispersant, on the other hand, covered an area 22 centimeters in diameter in 11 seconds and effected a 40.8% reduction in surface evaporation.

*Example VI*

Self-dispersing compositions of the invention were prepared by adding n-octanol in the amounts indicated to stearyl alcohol. The spreading characteristics of the mixtures were determined by adding a few grams of the composition to the center of a talcum powder-covered water surface 27 cm. in diameter. The time required for the monomolecular layer to replace the powder is recorded below.

| Percent dispersant (by weight) | Spreading rate (seconds) |
|---|---|
| 5 | 6 |
| 10 | 3 |
| 20 | 3 |
| 25 | 3 |

*Example VII*

Example VI was repeated except for substitution of cetyl alcohol for stearyl alcohol. The following results were obtained:

| Percent dispersant (by weight) | Spreading rate (seconds) |
|---|---|
| 5 | 7 |
| 10 | 6 |
| 20 | 5 |
| 25 | 3 |

In accordance with the foregoing examples, it will be seen that by employing the process of the invention and the compositions of the invention it is possible to effect a highly desirable reduction in surface evaporation of water. The compositions are relatively inexpensive, are easy to produce and to employ and, when used in excess of that required to produce the initial monomolecular layer of long chain, solid alcohol on the surface of water, will replenish that layer throughout the entire critical period where evaporation is a serious problem.

Since various modifications of this invention will be apparent from the foregoing disclosure, it is intended that the scope of the invention be limited only by the appended claims.

What is claimed is:

1. A process for retarding surface evaporation from bodies of water which comprises adding to said body of water a homogeneous normally solid composition comprising at least one solid, alkyl alcohol having from 14 to 18 carbon atoms and from about 5 to about 25% by weight of said solid alcohol of a liquid, alkyl alcohol having from 6 to 10 carbon atoms.

2. The process of claim 1 wherein said liquid, alkyl alcohol has 8 carbon atoms.

3. The process of claim 1 wherein said solid, alkyl alcohol is cetyl alcohol.

4. The process of claim 1 wherein said solid, alkyl alcohol is stearyl alcohol.

5. The process of claim 1 wherein said solid composition contains about 10% of a liquid, alkyl alcohol having from 6 to 10 carbon atoms.

6. A normally solid self-dispersing composition useful as an additive to water for retardation of surface evaporation which comprises a homogeneous mixture of at least one solid, alkyl alcohol having from 14 to 18 carbon atoms and from about 5 to about 25% by weight of said solid alcohol of a liquid, alkyl alcohol having from 6 to 10 carbon atoms.

7. The composition of claim 6 wherein said liquid, alkyl alcohol has 8 carbon atoms.

8. The composition of claim 6 wherein said solid, alkyl alcohol is cetyl alcohol.

9. The composition of claim 6 wherein said solid, alkyl alcohol is stearyl alcohol.

10. The composition of claim 6 wherein said solid composition contains about 10% of a liquid, alkyl alcohol having from 6 to 10 carbon atoms.

11. A process for reducing surface evaporation from a body of water which comprises adding to said body of water a solid solution of a solid alkyl alcohol having from 14 to 18 carbon atoms in a liquid branched-chain alkyl alcohol having from 6 to 8 carbon atoms.

References Cited in the file of this patent

Laycock: "Cetyl Alcohol Control Evaporation," Water and Sewage Works, August 1956.

Gregory: "Uses and Applications of Chemicals and Related Materials," vol. II, pages 236–237, Rheinhold Publishing Corp. N.Y., N.Y.

Mansfield: "Influence of Monolayers on the Natural Rate of Evaporation of Water," Nature, February 5, 1955, vol. 175, pp. 247–249.